Patented Mar. 25, 1941

2,235,971

UNITED STATES PATENT OFFICE 2,235,971

ORGANOLITE

Thomas L. Wilson, Cedar Grove, N. J., assignor to United States Rubber Company, New York, N. Y., a corporation of New Jersey No Drawing. Application June 2, 1939, Serial No. 276,970

6 Claims. (Cl. 260—79)

This invention relates to organic bodies suitable for use in ion-exchange processes. The term "organolite" has been proposed for such organic counterparts of zeolites (Burrell, Ind. Eng. Chem. 30, 358 (1938)).

The products, subject of the present invention, are sulphonated synthetic high molecular weight products prepared by sulphonating the high molecular hydrocarbon resins which are the subject of Shinkle patent, U. S. 2,016,026. Said resins are condensation products produced by reacting an aromatic compound having the general formula R—$C_6H_4$—R', wherein R and R' each represent hydrogen or a saturated aliphatic hydrocarbon radical containing more than one carbon atom, with an ethylene halide, particularly ethylene dichloride.

In carrying out the present invention, a high molecular hydrocarbon resin, preferably the benzene-ethylene chloride condensation product (subject of Example 1 of U. S. P. 2,016,026) is reacted with any sulphonating agent, such as concentrated sulphuric acid, oleum, sulphur trioxide or chloro-sulphonic acid, so that sulphonic acid groups (—$SO_3H$) are introduced into the molecular structure of the resin. The resulting product is a cation exchange body, or cation exchange organolite, of high capacity, suitable for use in recovering or removing cations from aqueous solutions.

The following example illustrates the invention in greater detail starting with the benzene-ethylene dichloride plastic:

*Example.*—The benzene-ethylene dichloride plastic is first shredded to facilitate the action of the sulphonating agent. To 100 grams of shredded plastic is added 200 cc. of concentrated sulphuric acid and the mixture is placed on a water bath and heated at 100° C. for one hour. At the end of an hour an additional 200 cc. of concentrated sulphuric acid is added to the mass and the mixture is placed in a container and heated until fumes of $SO_3$ are observed to be coming off. During this process the shredded resin swells and darkens. At the end of the second heating step the sulphonated resin occupies three to four times the volume occupied by the original resin and is a black pulverulent solid. The sulphonated resin is cooled and then washed with water until substantially free from sulphuric acid. The washed material may then be placed in a drier and dried in a current of hot air at a suitable temperature, for example 110° C. The dried material may then be ground to the proper degree of fineness and sieved to separate the fines from the larger particles.

45 grams of the sieved material made as described above, and of such fineness as to pass through a 20-mesh U. S. standard screen but to be retained by a 40-mesh U. S. standard screen, when swelled with water occupies a volume of 100 cc.

A 0.1 N sodium chloride solution when passed through 100 cc. of the wet material exchanges 2.07 g. of sodium ion for a molecularly equivalent amount of hydrogen ion. After regeneration of the organolite with 2 N hydrochloric acid, a solution of 0.1 N sodium hydroxide when passed over the resin was found to remove 3.06 grams of sodium ion in exchange for a molecularly equivalent amount of hydrogen ion. Due to its brittle and porous nature the organolite permits a very high percolation rate.

A similar organolite may be made by treating the benzene-ethylene dichloride product with oleum or chloro-sulphonic acid.

The bodies made according to the present invention have been found to have a capacity of from 0.1 to 0.2 equivalents of cation per 100 cc. of wet material.

The ion-exchange bodies or organolites subject of the present invention may be used in all manners known at present involving cation-exchange reactions, among them being the purification of water and organic and inorganic solutions of chemicals; also for the preparation of inorganic salts, bases, or acids where the cation-exchange capacity of the present organolites may be found suitable.

In utilizing the present invention, the organolites may be contacted with the solution containing the cation it is desired to remove or exchange by percolating the solutions through a bed of the active material.

Having thus described my invention, what I claim and desire to protect by Letters Patent is:

1. A water-insoluble material having cation-exchange properties resulting from sulphonating the plastic reaction product of one molar proportion of an aromatic compound having the general formula R—$C_6H_4$—R', wherein R and R' each represent a member selected from the class consisting of hydrogen and a saturated aliphatic hydrocarbon radical containing more than one carbon atom, with about 1-3 molar proportions of an ethylene dihalide.

2. A water-insoluble material having cation-exchange properties resulting from sulphonating the plastic reaction product of one molar proportion of an aromatic compound having the general formula R—C₆H₄—R', wherein R and R' each represent a member selected from the class consisting of hydrogen and a saturated aliphatic hydrocarbon radical containing more than one carbon atom, with about 1-3 molar proportions of ethylene chloride.

3. A water-insoluble material having cation-exchange properties resulting from sulphonating the plastic reaction product of one molar proportion of benzene with about one to three molar proportions of ethylene chloride.

4. A pulverulent water-insoluble substantially acid-free material having cation-exchange properties resulting from sulphonating the plastic reaction product of one molar proportion of an aromatic compound having the general formula R—C₆H₄—R', wherein R and R' each represent a member selected from the class consisting of hydrogen and a saturated aliphatic hydrocarbon radical containing more than one carbon atom, with about 1-3 molar proportions of an ethylene dihalide.

5. A pulverulent water-insoluble substantially acid-free material having cation-exchange properties resulting from sulphonating the plastic reaction product of one molar proportion of an aromatic compound having the general formula R—C₆H₄—R', wherein R and R' each represent a member selected from the class consisting of hydrogen and a saturated aliphatic hydrocarbon radical containing more than one carbon atom, with about 1-3 molar proportions of ethylene chloride.

6. A pulverulent water-insoluble substantially acid-free material having cation-exchange properties resulting from sulphonating the plastic reaction product of one molar proportion of benzene with about one to three molar proportions of ethylene chloride.

THOMAS L. WILSON.